(12) United States Patent
McClasky

(10) Patent No.: US 6,343,568 B1
(45) Date of Patent: Feb. 5, 2002

(54) NON-ROTATING TELESCOPING POLE

(76) Inventor: David R. McClasky, 39 Dauphine Dr., Lake St. Louis, MO (US) 63367

( * ) Notice: Subject to any disclaimer, the term of this patent is extended or adjusted under 35 U.S.C. 154(b) by 0 days.

(21) Appl. No.: 09/476,901

(22) Filed: Jan. 3, 2000

Related U.S. Application Data

(63) Continuation-in-part of application No. 09/047,881, filed on Mar. 25, 1998, now Pat. No. 6,009,837.

(51) Int. Cl.⁷ ............................................. A01K 31/00
(52) U.S. Cl. ..................................................... 119/428
(58) Field of Search ........................ 294/19.1; 414/23; 403/104, 109.3, 109.8, 109.6; 119/428, 429, 431, 432; 52/632, 118, 111

(56) References Cited

U.S. PATENT DOCUMENTS

| | | | |
|---|---|---|---|
| 1,169,409 A | 1/1916 | Larson | 119/23 |
| 1,516,381 A | 11/1924 | Erickson | D30/111 |
| 2,236,593 A | 9/1941 | Booth | D30/110 |
| 2,319,992 A | * 5/1943 | Hubbard | |
| D163,666 S | 6/1951 | Worden | D30/110 |
| D164,707 S | 10/1951 | Nissen | D30/110 |
| D170,833 S | 11/1953 | Rebora | D30/110 |
| 2,951,312 A | 9/1960 | Engh | D30/111 |
| 3,111,934 A | 11/1963 | Vail | 119/428 |
| 3,367,632 A | * 2/1968 | Vail | |
| 3,418,976 A | 12/1968 | Vail | 119/428 |
| 3,426,732 A | 2/1969 | Wade | 119/428 |
| 3,563,205 A | 2/1971 | Vail | 119/428 |
| D221,090 S | 7/1971 | Vail | D30/111 |
| 3,696,792 A | * 10/1972 | Bruhns | 119/428 |
| 3,792,685 A | 2/1974 | Wiener | 119/428 |
| D233,994 S | 12/1974 | Bishop, Sr. | D30/110 |
| D245,927 S | 9/1977 | Edwards et al. | D30/3 |
| D281,917 S | 12/1985 | Myers et al. | D30/3 |
| 4,765,277 A | * 8/1988 | Bailey et al. | 119/428 |
| 4,918,896 A | 4/1990 | Wiese | 52/632 |
| 5,152,627 A | * 10/1992 | Arnold | 403/109 |
| 5,515,574 A | * 5/1996 | Larson | 403/109 |
| 5,524,858 A | 6/1996 | Friend | 248/548 |
| 5,540,017 A | 7/1996 | Eilam et al. | 52/118 |
| 5,572,835 A | 11/1996 | Atkins et al. | 52/111 |

FOREIGN PATENT DOCUMENTS

| | | | |
|---|---|---|---|
| DE | 2323506 | 11/1974 | 119/428 |

* cited by examiner

*Primary Examiner*—Thomas Price
(74) *Attorney, Agent, or Firm*—Grace J. Fishel

(57) ABSTRACT

A non-telescoping pole with interengaging sections that are convex polygonal in cross-section such that the sections are axially slidable with respect to each other but not rotatable. When said pole has three sections, upper, intermediate and lower, the sidewalls of upper section are preferably made with an incurved portion forming a longitudinal groove and the sidewalls of the lower section are preferably made with an outcurved portion forming a spline such that a cavity is formed between the grooves and the intermediate section and between the spline and the intermediate section to reduce friction between the sections.

5 Claims, 4 Drawing Sheets

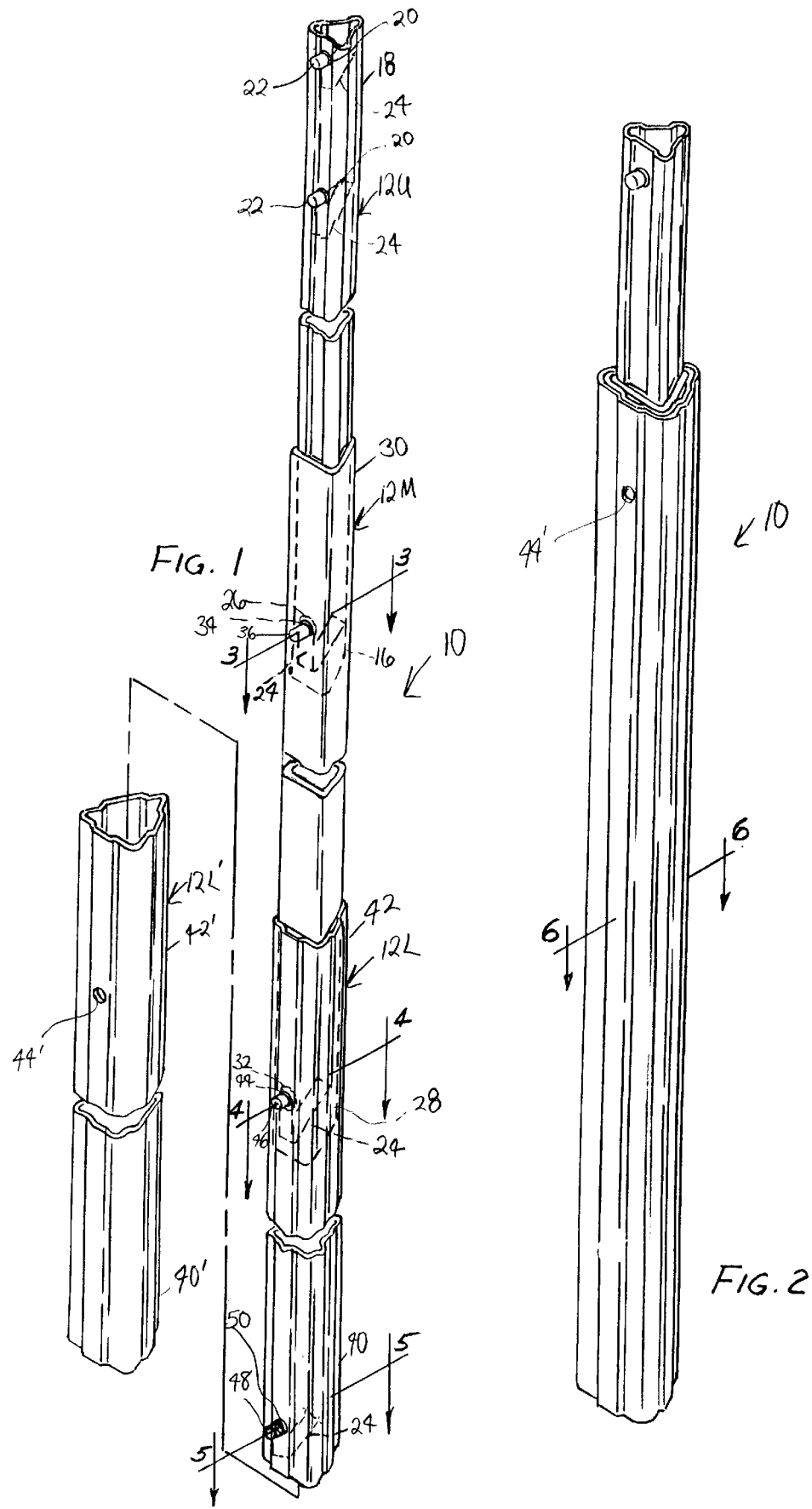

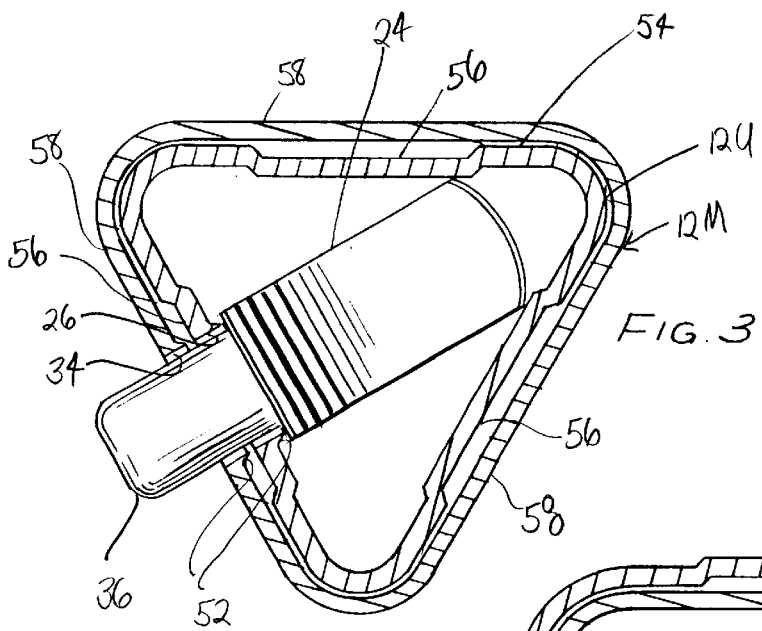
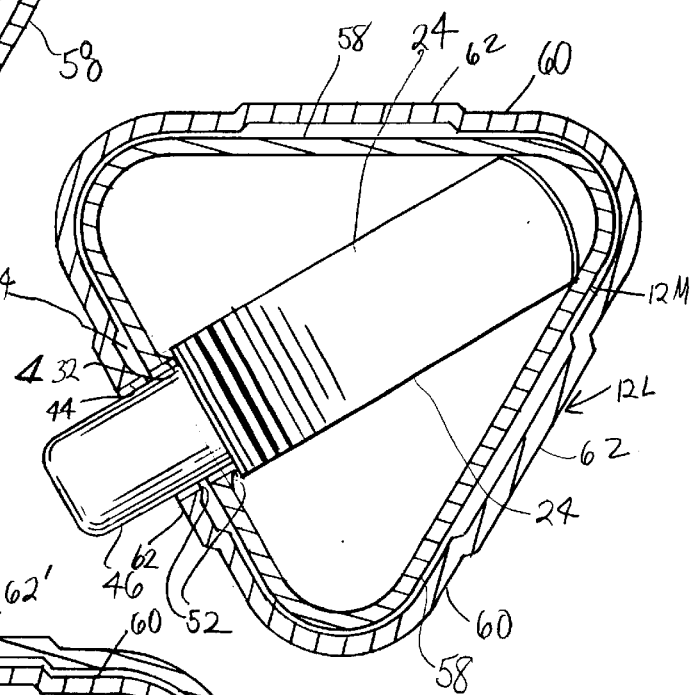
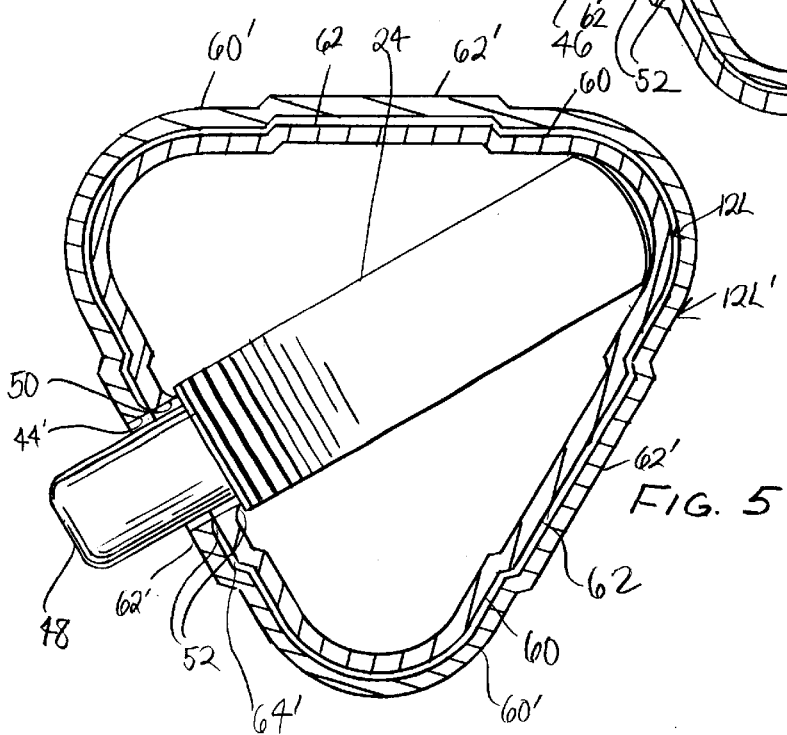

NON-ROTATING TELESCOPING POLE

This application is a continuation-in-part of U.S. application Ser. No. 09/047,881, filed Mar. 25, 1998, now U.S. Pat. No. 6,009,837 for Purple Martin Birdhouse and Telescoping Pole.

BACKGROUND OF THE INVENTION

1. Field of the Invention

The present invention is directed to a non-rotating, telescoping pole which may be extended to elevate a birdhouse, flag or the like, and which may be telescoped into a shorter, compact, easy-to-handle structure for carrying, storage and shipping.

2. Brief Description of the Prior Art

Telescoping poles have been developed for mounting a birdhouse, flag or the like. One advantage of such a structure is that the unit can be constructed on the site from relatively short sections which are easier to carry, store and ship than a traditional rigid, one-piece pole.

Telescoping poles usually have two or more concentrically disposed tubular sections that are axially movable with respect to each other. Relative movement of the sections is inhibited with a locking device housed within one or more of the inner sections. The locking device typically comprises a pin that is biased to extend from an inner section through a hole in an adjacent outer section.

The tubular sections usually rotate with respect to each other so that there must be a stop means to keep the inner section from being pulled out of the outer section, which will happen, unless by chance the pin is in alignment with the hole as the inner section is extended. A common stop means comprises a bushing ring within the upper end of the intermediate and bottom sections for coaction with a detent ring which is provided at the lower end of the top and intermediate sections. As the sections are extended axially, the detent ring at the bottom of each inner section contacts the annular ring at the top of the adjacent outer section to limit the upward extension of the tubes. Each of the inner tubes is then rotated in the respective outer tube until the pin snaps into the hole in the outer tube. The bushing rings, in addition to serving as a stop, maintain a space between the sections to reduce friction between sections as they slide within each other. This is important as it is desirable to avoid the use of ropes and pulleys to raise and lower the sections weighted with a birdhouse, flag or the like. Such prior art telescoping poles, even those without pulleys, require the manufacture of additional parts (e.g., bushing and detent) and additional installation steps that increase the cost of assembly. Furthermore, the need for internal parts increases the likelihood of adjacent ill-fitting sections and also increases maintenance requirements.

Since the tubular sections of a conventional telescoping pole rotate inside each other, the orientation of a birdhouse, flag or the like mounted on the pole will not necessarily be the same when the item is put up and taken down. When the birdhouse is for a purple martin colony, this is of critical importance since martins recognize their own nest compartment in a purple martin birdhouse by its height, relative position and compass direction. If a birdhouse is repositioned in a different compass direction, havoc will break out. Purple martins will go into the compartment in the position where their nest was and perhaps find nestlings, when all they had was eggs. In such case, they may throw the foreign young out. Others, while looking for their nests may trespass into the compartments of others, which can result in prolonged and potentially lethal battles. The end result of which may be reproductive failure, leading to colony-site abandonment.

With some prior art telescoping poles, a person can mark the sections to ensure that the birdhouse is repositioned with the correct polarization, but people either forget to mark the sections or forget, between uses, what the markings mean. There are also non-rotating telescoping poles with elaborate and complicated mechanisms to prevent rotation of the sections or the house. Such means usually include elongated guides which are formed separately and attached to the telescoping members, increasing manufacturing and maintenance costs as described above.

BRIEF SUMMARY OF THE INVENTION

In view of the above, it is an object of the present invention to provide a non-rotating telescoping pole formed of two or more sections without additional parts such as bushings, detents and pulleys. It is another object to provide a non-rotating telescoping pole that ensures consistent polarization of a birdhouse, such as a purple martin birdhouse, when it is taken down and reinstalled on a pole. Other objects and features of the invention will be in part apparent and in part pointed out hereinafter.

In accordance with the invention, a non-rotatable telescoping pole for mounting a birdhouse, flag or the like with consistent polarization has an inner tubular section with first and second ends and a cross-section having the shape of a convex polygon, such as an equilateral triangle. An outer tubular section, with first and second ends, has a bore generally corresponding to the cross-section of the inner section, the bore of the outer section being in frictional contact with the inner tubular section and the inner tubular section axially slidable within the bore of the outer section.

The outer tubular section also has a hole proximate its second end and the inner tubular section has a hole proximate its first end. The inner tubular section has a pin aligned with said hole and a biasing element that biases the pin outwardly through the hole. The pin at the first end of the inner section is also aligned with the hole in the outer section when the inner section is extended. The pin is biased outwardly through the hole in the outer section, thus impeding further relative axial movement of the inner and outer sections. Relative rotation of the inner and outer sections is prevented by engagement of the inner tubular section with the bore of the outer section.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention are illustrated, corresponding reference characters refer to corresponding parts throughout the several views of the drawings in which:

FIG. 1 is a perspective view of a non-rotating telescoping pole in accordance with the present invention, having four sections, shown in extended condition;

FIG. 2 is a perspective view of the pole in retracted condition;

FIG. 3 is a sectional view taken along line 3—3 in FIG. 1;

FIG. 4 is a sectional view taken along line 4—4 in FIG. 1;

FIG. 5 is a sectional view taken along line 5—5 in FIG. 1;

FIG. 8 is an adapter for use with the pole shown in FIG. 1 for mounting a birdhouse having a circular receiver or the like;

DETAILED DESCRIPTION OF THE INVENTION

Figure 9:
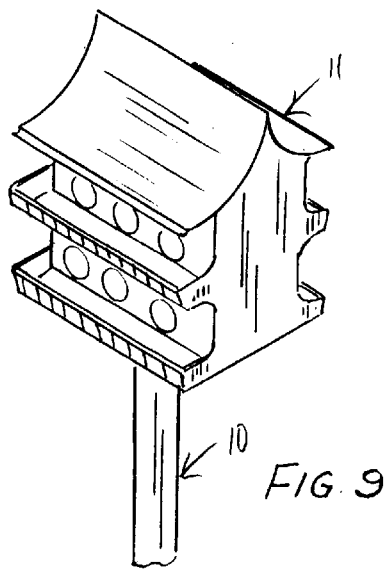
FIG. 9 is a perspective view showing a birdhouse with a receiver that is convex polygonal (e.g., triangular) in cross-section as described in U.S. application Ser. No. 09/047,881, filed Mar. 25, 1998, on the pole shown in FIG. 1.
Figure 10:
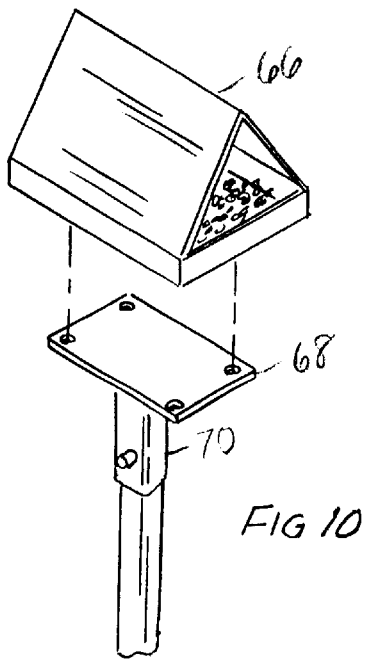
FIG. 10 is an exploded perspective view of a feeder mounted on the pole shown in FIG. 1.

Referring to the drawings more particularly by reference character, reference numeral 10 refers to a non-rotatable telescoping pole in accordance with the present invention. As shown in FIG. 9, pole 10 can be used to mount a purple martin birdhouse 11 as described in U.S. application Ser. No. 09/047,881, filed Mar. 25, 1998, for Purple Martin Birdhouse and Telescoping Pole which is incorporated by reference herein. While pole 10 was developed for use with the above-mentioned birdhouse, the invention is not limited to this use as will be understood from the discussion which follows.

Figure 6:
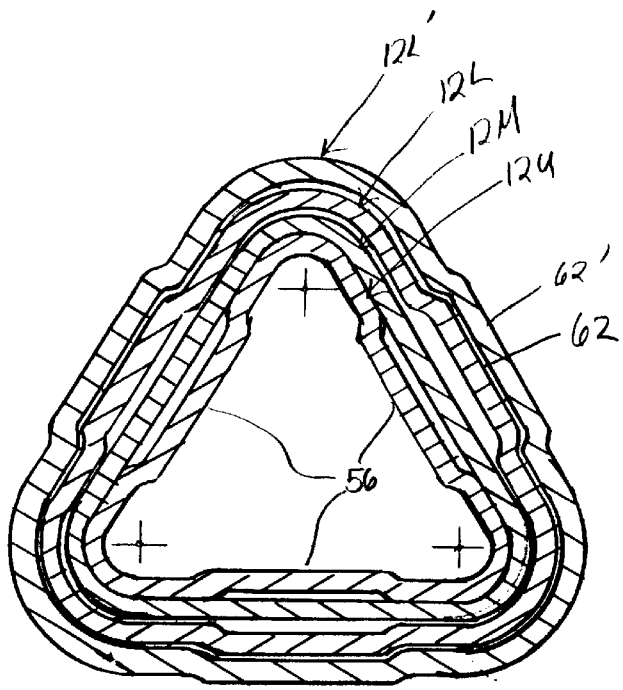
FIG. 6 is a sectional view taken along line 6—6 in FIG. 2 showing the four concentric sections making up the pole.
Figure 7:
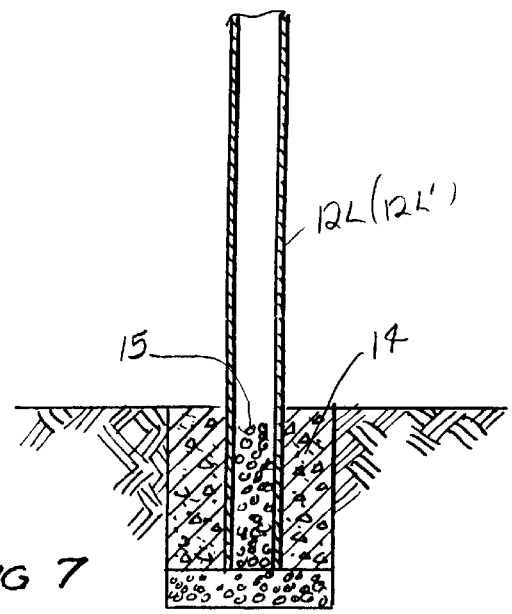
FIG. 7 is a side elevation in cross-section showing the lowermost section of the pole set in cement and partially filled with pea gravel.

As shown in FIGS. 1–6, non-rotating pole 10 is formed of a plurality of interengaging telescoping tubular sections 12, preferably made of aircraft aluminum for strength. In the form illustrated, which is a preferred embodiment, pole 10 has three or four sections—namely, an upper section 12U, a middle section 12M and a lower section 12L, each of which in a commercial embodiment is 69 inches long when the pole has three sections. In fully extended condition, the sections preferably overlap 6 inches and the end of lower section 12L is footed 18 inches deep in a fixative, such as cement 14 as shown in FIG. 7. With continuing reference to FIG. 7, the inside of lower section 12L may be filled with pea gravel 15 or the like such that the inner sections to not fully retract inside lowermost section 12L making them difficult to pull out.

Pole 10 with sections 69 inches long provides a support for a birdhouse, flag or the like, positioning it about 15 feet above the ground. When sections 12 are 54 inches long, a fourth section 12L' may be provided and the sections will pack in a box under 60 inches long for shipping. Four sections 12 at this length also form a pole about 15 feet high. While three sections 69 inches long or four sections 54 inches long are preferred, it will be apparent that the invention is not limited to these particulars and that telescoping pole may be made with only two sections or with more than four sections of other lengths.

Each of tubular sections 12U, 12M, 12L and 12L' has a hollow central bore and is convex polygonal in cross-section. The polygon may be either regular or irregular, with three or more straight or curvilinear sides. Sections 12 may be formed from square tubing or the like but it is preferred that sections 12 have three sides and be equilateral triangular in cross-section.

Upper section 12U has first and second ends 16, 18, respectively, and a cross-sectional shape corresponding to the cross-section of a receiver (shown as member 38 in U.S. application Ser. No. 09/047,881, filed Mar. 25, 1998). Second end 18 of upper section 12U has at least one and preferably two vertically aligned holes 20. A pin 22 is aligned with each of holes 20 and is biased outwardly through the hole with a biasing element such as a spring clip 24. When purple martin birdhouse 11 is installed on upper section 12U, pole 10 passes through a pair of receivers (38) until the top of the pole is flush with the top of the floor in the top tier, at which time pins 22 are biased through holes 20 into the receivers, locking the birdhouse to the pole. While the end of upper section 12U could be received in the receivers (38) in three different orientations, pins 22 assure that it will be installed in the same orientation each time the birdhouse is reinstalled. This ensures that when the birdhouse is taken down at the end of the season that it will be reinstalled on pole 10 in the same polarization or compass direction next year. Relative movement of second end 18 in the receiver is prevented by contact of the outer surface of section 12U with the inside of the receiver (38), correct polarization, however, requires pins 22.

First end 16 of upper section 12U is received in middle tubular section 12M and has a hole 26 proximate its first end. Middle tubular section 12M has first and second ends 28, 30, respectively and holes 32, 34 proximate the first and second ends, respectively. A pin 36 is biased through hole 26 in first end 16 of upper section 12U with spring clip 24 or the like. When upper section 12U is withdrawn from middle section 12M, leaving a small overlap between the sections, pin 26 is biased through hole 34 in second end 30 of middle section 12M, locking the two sections together. Relative movement of first end 16 of upper section 12U in second end 30 of middle section 12M is prevented by the triangular shape of the tubular sections.

In similar manner first end 28 of middle section 12M is received in lower tubular section 12L. Lower tubular section 12L has first and second ends 40, 42 respectively, first end of which may be seated in fixative 14 as described above or received in a second, still lower section 12L'. A hole 44 is provided proximate second end 42 of lower section 12L. A pin 46 is biased through the hole in the first end of middle section 12M with spring clip 24. When middle section 12M is withdrawn from lower section 12L, with about 6 inches overlap between the section, the two sections are locked together with pin 46, stopping relative axial movement of the sections. Relative rotation of middle section 12M in lower section 12L is prevented by the triangular shape of the tubular sections. Lower section 12L is received in second section 12L' in like fashion. In this instance, second lower tubular section 12L' with first and second ends 40', 42', respectively, is seated in fixative 14 at first end 40'. A hole 44' is provided proximate second end 42' of lower section 12L'. A pin 48 is biased through a hole 50 in the first end of lower section 12L with spring clip 24. When lower section 12L is withdrawn from second lower section 12L', leaving about 6 inches overlap, the two sections are locked together with pin 48, stopping relative axial movement of the sections. Relative rotation of lower section 12L in second lower section 12L' is prevented by the polygonal shape of the tubular sections.

As holes 20 and 26, 32 and 34, 44 and 50 and hole 44' are drilled into sections 12U, 12M, 12L and 12L', respectively, a small burr 52 is formed on the inside of each section. This burr causes the sections to grind against each other and makes them more difficult to extend and retract. Hence in a preferred embodiment, as shown in FIG. 3, sidewalls 54 of upper section 12U have in incurved portion forming a longitiudinal groove 56 while middle section 12M has flat sidewalls 58. As shown in FIG. 3, burrs 52 in holes 32 and 34 in middle section 12M are received in groove 56 of upper section 12U. In additional to accommodating burrs 52, grooves 56 reduces frictional contact between the sections, serving the same function as the bushings in prior art telescoping poles, without requiring a separate part.

Lower section 12L has sidewalls 60 with an outcurved portion forming a longitudinal spline 62. As shown in FIG. 4, holes 44 and 50 in lower section 12L are received in a cavity 64 formed under spline 62. Spline 62, like groove 56, is angled away from flat sidewalls 58 of middle section 12M, reducing frictional contact between the sections. When a second lower section 12L' is present, it too has sidewalls 60' with an outcurved portion forming a longitudinal spline 62'. As shown in FIG. 5, hole 44' is second lower section 12L' is received in a cavity 64' formed between splines 62 and 62', spline 62' being wider and taller than spline 62 for this purpose. Although it is preferred that sections 12 include groove 56 and spline 62 (62'), pole 10 may have flat sidewalls 54 and 60 (60') as shown in FIGS. 14–16 of U.S. application Ser. No. 09/047,881, filed Mar. 25, 1998. It is also possible that lower section 12L' be provided as a short sleeve set in fixative 14 at about ground level such that the balance of pole 10 can be removed for storage, if desired.

Figure 8:
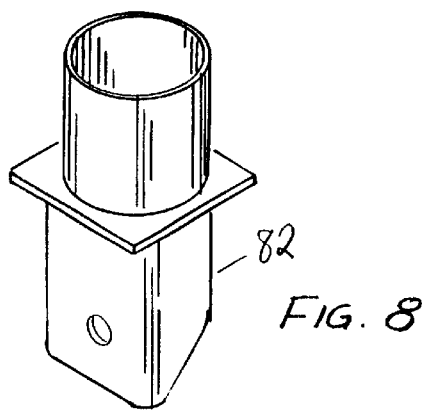
Figure 12:
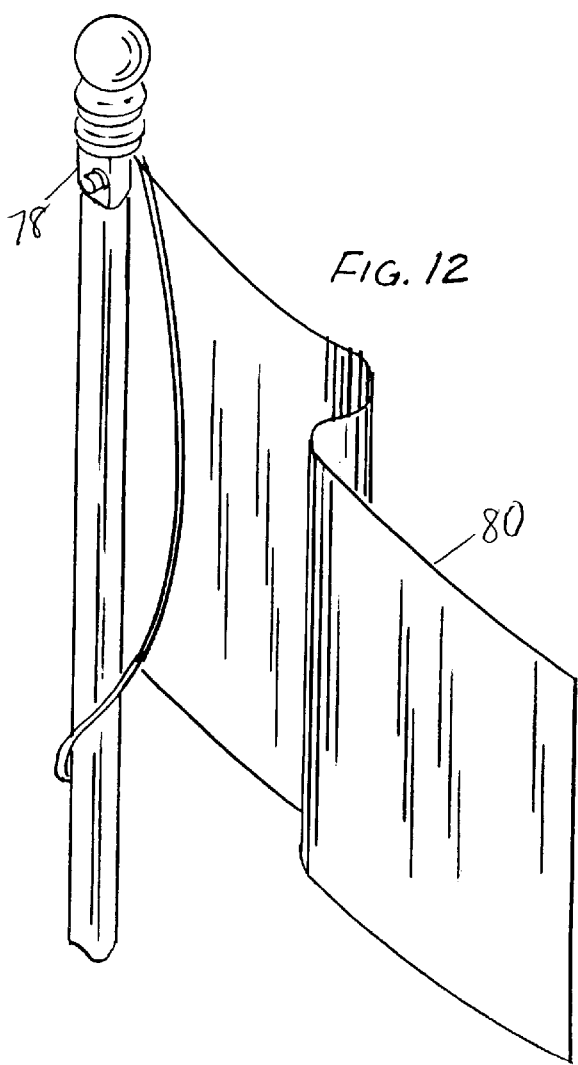
Figure 11:
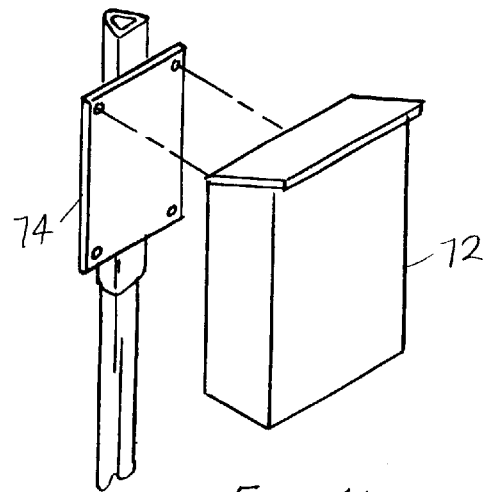
FIG. 11 is an exploded perspective view of a bat house mounted on the pole shown in FIG. 1; and, FIG. 12 is a perspective view of a flag mounted on the pole shown in FIG. 1.
Figure 6:
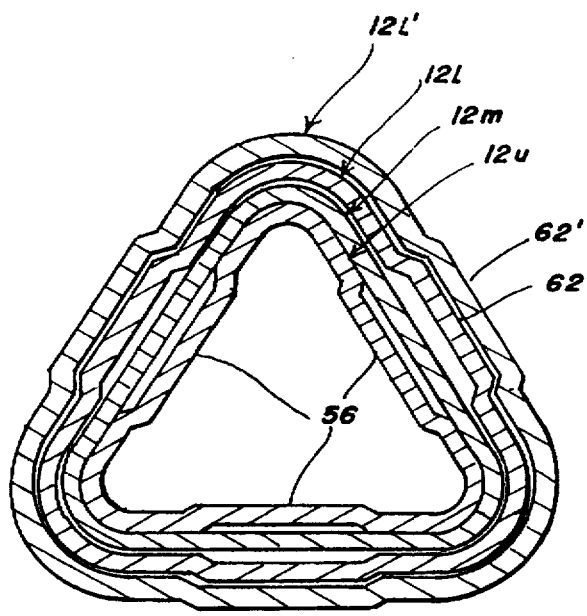
Figure 7:
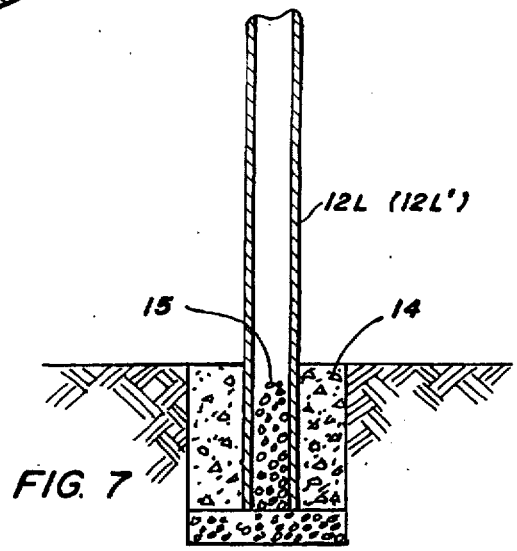
Figure 8:
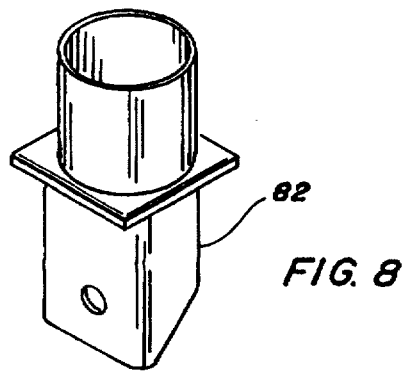
Figure 9:
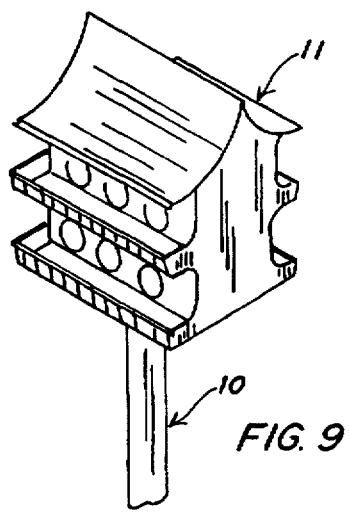
Figure 10:
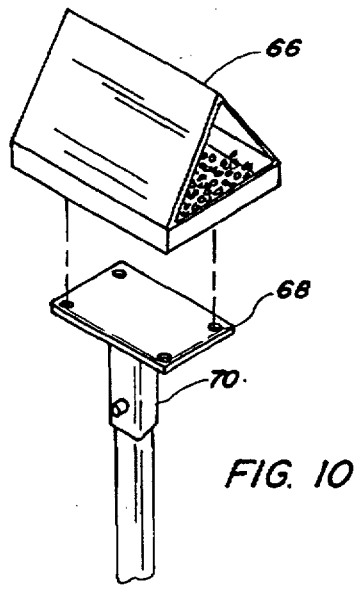
Figure 12:
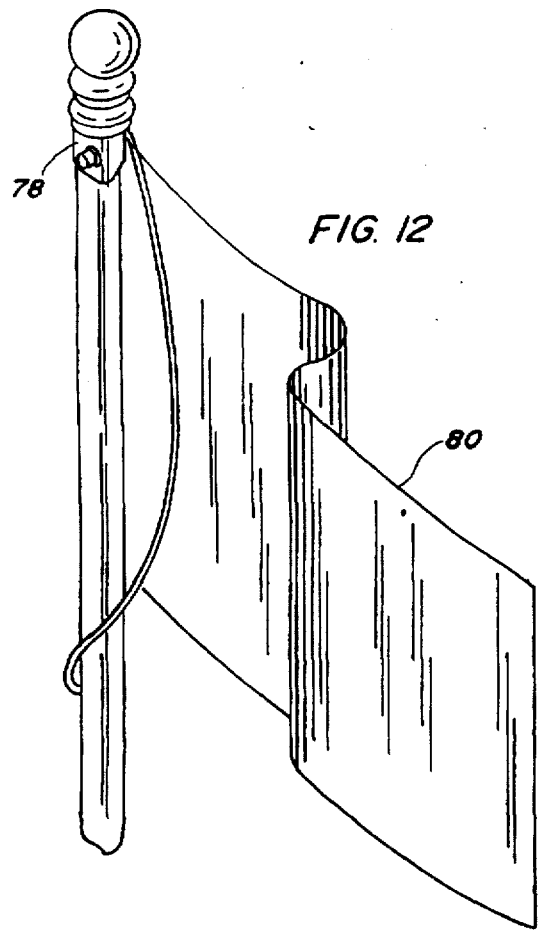
Figure 11:
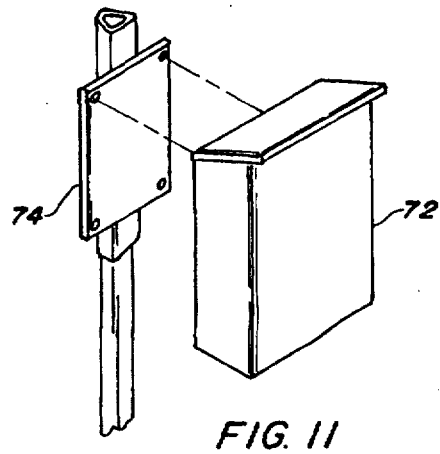

While non-rotating telescoping pole 10 is specially adapted for use with the purple martin birdhouse mentioned above, it may be used for other purposes, illustrative ones of which are shown in FIGS. 8 and 10–12. A feeder 66, shown in FIG. 10, may be mounted on a horizontal plate 68 attached to a receiver 70 having a bore with a cross-sectional shape the same as the bore of the receiver (38) on the birdhouse. In corresponding manner, a bat house 72, illustrated in FIG. 11, is mounted on a vertical plate 74 and can be attached with a receiver 76, as can an adapter 78 as shown in FIG. 12 with a swivel for attachment of a flag 80. Other adapters 82 as shown in FIG. 8, may be provided for mounting a device such as an ordinary purple martin birdhouse with a circular receiver to pole 10. Non-rotating telescoping pole 10 will prevent accidental rotation of an ordinary house during nest checks of the birds during the season, rotation of the house when it is removed for winter will not be prevented, however, unless the top of the pole and the house are marked, and the meaning of the markings remembered. Other possible devices that can be mounted on pole 10 include a support for gourds and so forth. Hence it is seen that non-rotating telescoping pole 10 can be utilized year-round for different purposes, separate and apart from its intended use with the above-mentioned purple martin birdhouse.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

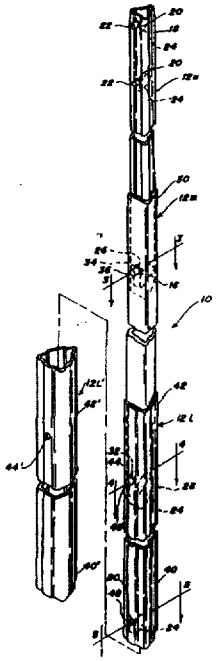

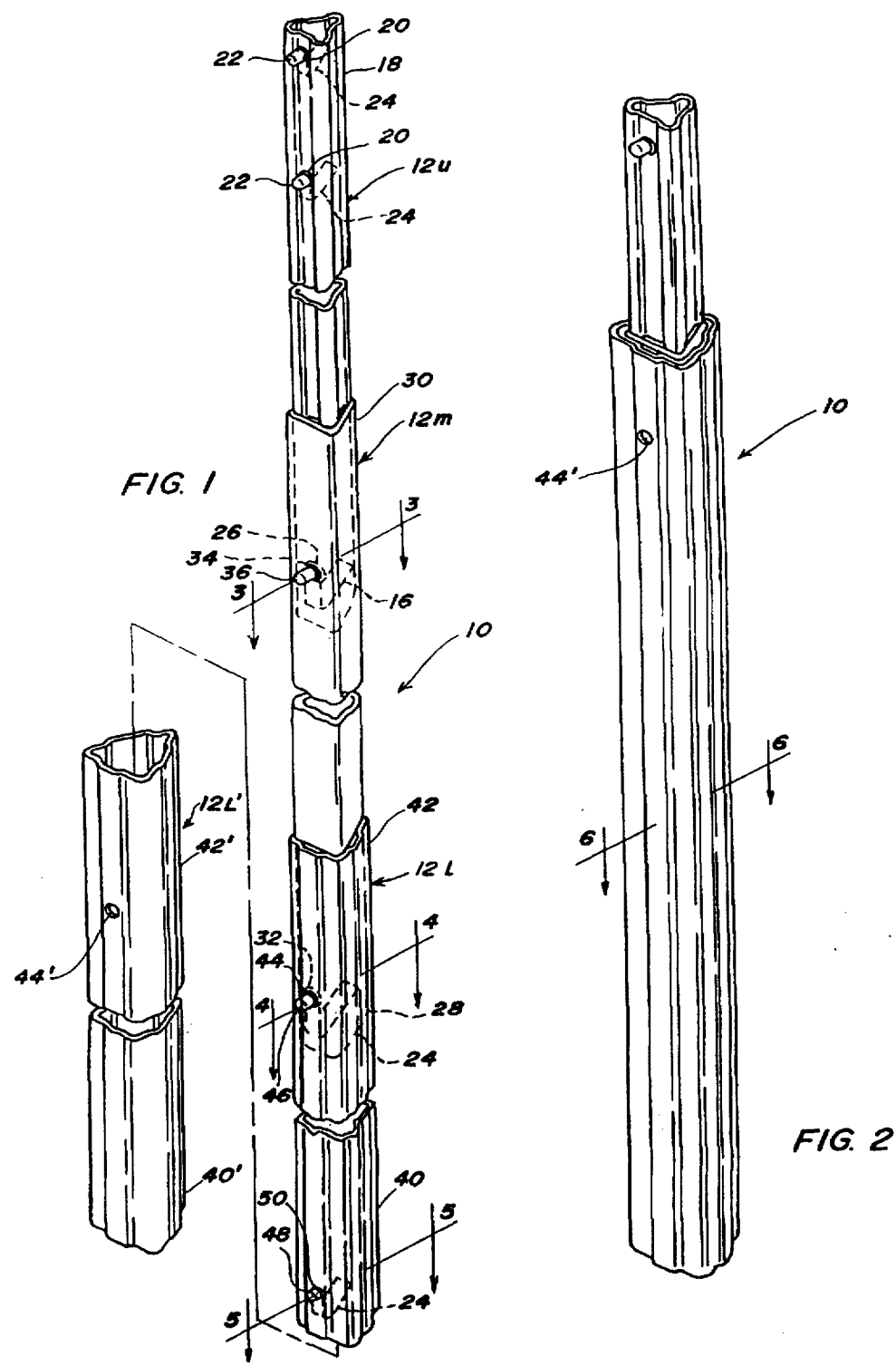

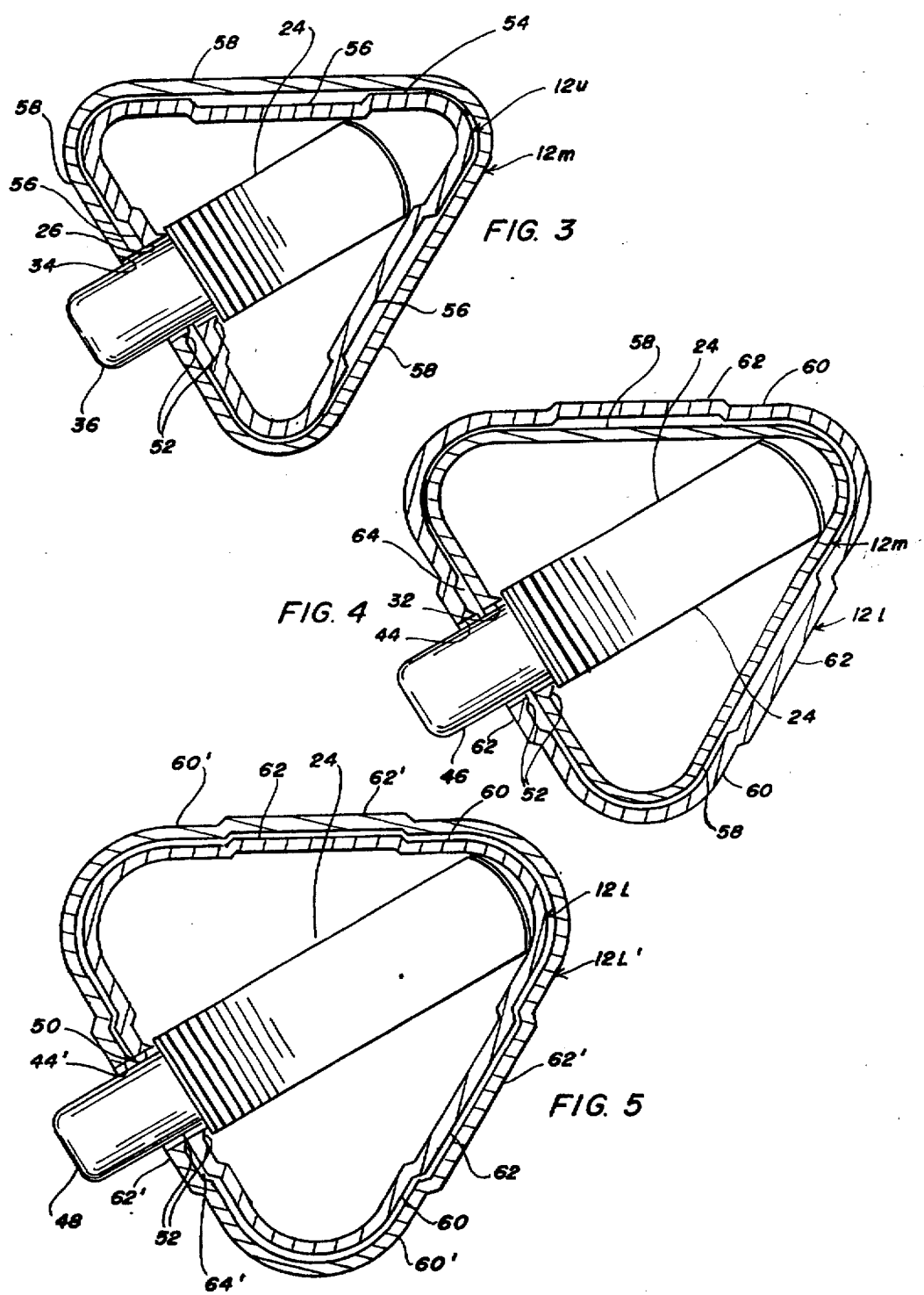

What is claimed:

1. A non-rotatable telescoping pole having upper, intermediate and lower interengaging telescoping tubular sections axially slidable between a retracted position and an extended position, each of said sections being generally triangular in cross-section, said upper section having sidewalls, each of which has an incurved portion forming a longitudinal groove, said intermediate section having flat sidewalls and said lower section having sidewalls, each of which has an outcurved portion forming a longitudinal spline.

2. The pole of claim 1 wherein each of the three tubular sections has first and second ends and wherein the upper and intermediate sections have a hole proximate the first and second ends and the lower section has a hole proximate at least the second end, said holes in the intermediate section being aligned with one of the grooves in the upper section and said holes in the outer section being in one of the splines in the outer section, said upper and intermediate sections having a pin aligned with the hole proximate its first end and a biasing element that biases the pin outwardly through the hole, said pin at the first end of the upper and intermediate sections aligned with the hole in the second end of the intermediate and lower sections when the sections are extended, said pin biased outwardly in the hole in the intermediate and lower sections, thus impeding further relative axial movement of the sections, relative rotation of said sections being prevented by engagement of the upper tubular section with the bore of the intermediate section and by engagement of the intermediate tubular section with the bore of the lower section.

3. A non-rotatable telescoping pole comprising:

an inner tubular section having first and second ends and being triangular in cross-section, said inner tubular section having sidewalls, each of which has an incurved portion forming a longitudinal groove;

an outer tubular section having a bore corresponding to the cross-section of the inner section, said outer section having first and second ends, said outer tubular section having flat sidewalls, said bore of the outer section being in friction contact with the inner tubular section, said inner tubular section axially slidable within the bore of the outer section;

said outer tubular section having a hole proximate its second end and said inner tubular section having a hole proximate its second end, said inner tubular section having a pin aligned with each hole and a biasing element that biases the pin outwardly through the hole, said pin at the first end of the inner section aligned with the hole in the outer section when the inner section is extended from the outer section, said pin biased outwardly in the hole in the outer section, thus impeding further relative axial movement of the inner and outer sections, relative rotation of said inner and outer sections being prevented by engagement of the inner tubular section with the bore of the outer section;

whereby the pole can be used for raising and lowering an object mounted thereon without rotating the item.

4. A non-rotatable telescoping pole to which a purple martin birdhouse may be affixed with consistent polarization of the birdhouse when the birdhouse is mounted on a receiver with a bore of cross-section the shape of a triangle and the bore has a hole for receipt of a pin, said telescoping pole comprising:

an inner tubular section having an outer surface with a cross-section of shape corresponding to the cross-section of the receiver, said inner tubular section having first and second ends and sidewalls, each of which has an incurved portion forming a longitudinal groove;

an outer tubular section having a bore corresponding to the cross-section of the outer surface of the inner section, said outer section having first and second ends and flat sidewalls, said bore of the of the outer section being in friction contact with the outer surface of the inner tubular section, said inner tubular section axially slidable within the bore of the outer section;

said outer tubular section having a hole proximate its second end and said inner tubular section having a hole proximate its first end and a hole proximate its second end, said inner tubular section having a pin aligned with each of said holes and a biasing element that biases the pin outwardly through the hole, said pin at the first end of the inner section aligned with the hole in the outer section when the inner section is extended from the outer section, said pin biased outwardly in the hole in the outer section, thus impeding further relative axial movement of the inner and outer sections, relative rotation of said inner and outer sections being prevented by engagement of the outer surface of the inner tubular section with the bore of the outer section;

said pin at the second end of the inner section aligned with the hole in the receiver of the birdhouse, when the birdhouse is mounted on the pole, said pin biased outwardly into the hole, thus attaching the birdhouse to the pole in only one orientation, relative rotation of the receiver and the inner section being prevented by engagement of the outer surface of the inner tubular section with the bore of the receiver, whereby the pole can be used for raising and lowering the birdhouse for nest checks and the birdhouse can be removed and reinstalled on the pole with consistent polarization of the birdhouse.

5. The pole of claim 4 wherein the outer tubular section has an outer tubular surface with a cross-section of shape corresponding to the cross-section of the receiver and a hole proximate its first end, a pin aligned with said hole at the first end of the outer tubular section and a biasing element that biases the pin outward through the hole, said pole further comprising:

a second outer tubular section having a bore corresponding to the cross-section of the outer surface of the first outer section, said second outer section having first and second ends, said bore of the second outer section being in friction contact with the outer surface of the first outer tubular section, said first outer tubular section axially slidable within the bore of the second outer section;

said second outer tubular section having a hole proximate its second end and said pin at the first end of first outer section aligned with the hole in the second outer section when the first outer section is extended from the second outer section, said pin biased outwardly in the hole in the second outer section, thus impeding further relative axial movement of the first and second outer sections, relative rotation of said first and second outer sections being prevented by engagement of the outer surface of the first outer section with the bore of the second outer section.

* * * * *

UNITED STATES PATENT AND TRADEMARK OFFICE
CERTIFICATE OF CORRECTION

PATENT NO.    : 6,343,568 B1
DATED         : February 5, 2002
INVENTOR(S)   : David R. McClaskey It is certified that error appears in the above-identified patent and that said Letters Patent is hereby corrected as shown below:

<u>Title page,</u>
The title page showing the illustrative figure, should be deleted and substitute therefore the attached title page.

<u>Drawings,</u>
The drawing sheets, consisting of Figs. 1-12, should be deleted to be replaced with the drawing sheets, consisting of Figs. 1-12, as shown on the attached page.

Item [76], should read -- David R. McClaskey --

Signed and Sealed this

Twenty-eighth Day of May, 2002

Attest:

Attesting Officer

JAMES E. ROGAN
*Director of the United States Patent and Trademark Office*

United States Patent
McClasky

(10) Patent No.: US 6,343,568 B1
(45) Date of Patent: Feb. 5, 2002

(54) NON-ROTATING TELESCOPING POLE

(76) Inventor: David R. McClasky, 39 Dauphine Dr., Lake St. Louis, MO (US) 63367

( * ) Notice: Subject to any disclaimer, the term of this patent is extended or adjusted under 35 U.S.C. 154(b) by 0 days.

(21) Appl. No.: 09/476,901

(22) Filed: Jan. 3, 2000

Related U.S. Application Data

(63) Continuation-in-part of application No. 09/047,881, filed on Mar. 25, 1998, now Pat. No. 6,009,837.

(51) Int. Cl.[7] .................................. A01K 31/00
(52) U.S. Cl. ........................................ 119/428
(58) Field of Search ................ 294/19.1; 414/23; 403/104, 109.3, 109.8, 109.6; 119/428, 429, 431, 432; 52/632, 118, 111

(56) References Cited

U.S. PATENT DOCUMENTS

| | | | |
|---|---|---|---|
| 1,169,409 A | 1/1916 | Larson | 119/23 |
| 1,516,381 A | 11/1924 | Erickson | D30/111 |
| 2,236,593 A | 9/1941 | Booth | D30/110 |
| 2,319,992 A | * 5/1943 | Hubbard | |
| D163,666 S | 6/1951 | Worden | D30/110 |
| D164,707 S | 10/1951 | Nissen | D30/110 |
| D170,833 S | 11/1953 | Rebora | D30/110 |
| 2,951,312 A | 9/1960 | Engh | D30/111 |
| 3,111,934 A | 11/1963 | Vail | 119/428 |
| 3,367,632 A | * 2/1968 | Vail | |
| 3,418,976 A | 12/1968 | Vail | 119/428 |
| 3,426,732 A | 2/1969 | Wade | 119/428 |
| 3,563,205 A | 2/1971 | Vail | 119/428 |
| D221,090 S | 7/1971 | Vail | D30/111 |
| 3,696,792 A | * 10/1972 | Bruhns | 119/428 |
| 3,792,685 A | 2/1974 | Wiener | 119/428 |
| D233,994 S | 12/1974 | Bishop, Sr. | D30/110 |
| D245,927 S | 9/1977 | Edwards et al. | D30/3 |
| D281,917 S | 12/1985 | Myers et al. | D30/3 |
| 4,765,277 A | * 8/1988 | Bailey et al. | 119/428 |
| 4,918,896 A | 4/1990 | Wiese | 52/632 |
| 5,152,627 A | * 10/1992 | Arnold | 403/109 |
| 5,515,574 A | * 5/1996 | Larson | 403/109 |
| 5,524,858 A | 6/1996 | Friend | 248/548 |
| 5,540,017 A | 7/1996 | Eilam et al. | 52/118 |
| 5,572,835 A | 11/1996 | Atkins et al. | 52/111 |

FOREIGN PATENT DOCUMENTS

DE    2323506    11/1974    ............ 119/428

* cited by examiner

Primary Examiner—Thomas Price
(74) Attorney, Agent, or Firm—Grace J. Fishel

(57) ABSTRACT

A non-telescoping pole with interengaging sections that are convex polygonal in cross-section such that the sections are axially slidable with respect to each other but not rotatable. When said pole has three sections, upper, intermediate and lower, the sidewalls of upper section are preferably made with an incurved portion forming a longitudinal groove and the sidewalls of the lower section are preferably made with an outcurved portion forming a spline such that a cavity is formed between the grooves and the intermediate section and between the spline and the intermediate section to reduce friction between the sections.

5 Claims, 4 Drawing Sheets